Nov. 4, 1969    W. D. CORNETT, JR    3,476,337
SOLIDS SPREADER FOR AGRICULTURAL AIRCRAFT
Filed Nov. 27, 1968    4 Sheets-Sheet 1
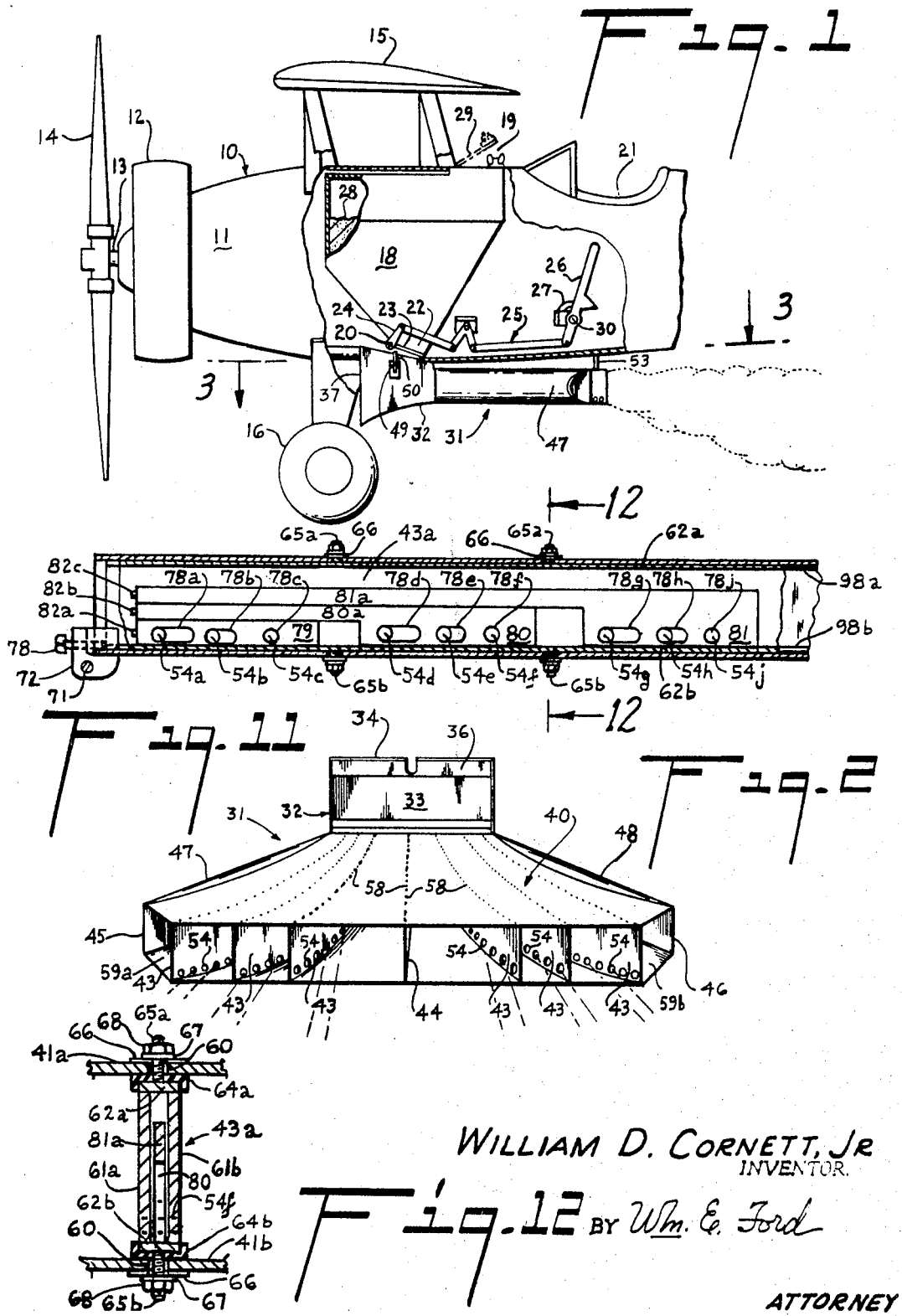
WILLIAM D. CORNETT, JR
INVENTOR.
BY Wm. E. Ford
ATTORNEY Nov. 4, 1969     W. D. CORNETT, JR     3,476,337
SOLIDS SPREADER FOR AGRICULTURAL AIRCRAFT
Filed Nov. 27, 1968     4 Sheets-Sheet 2
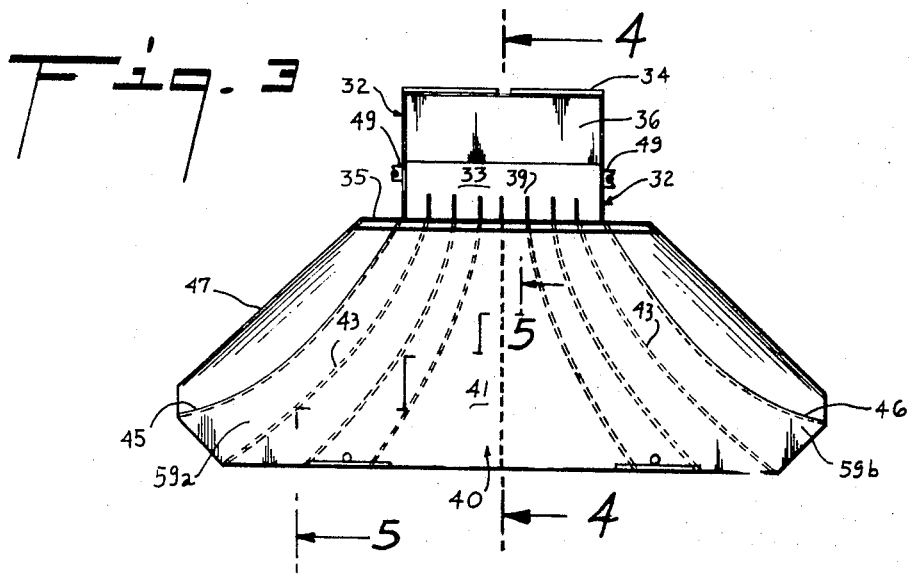
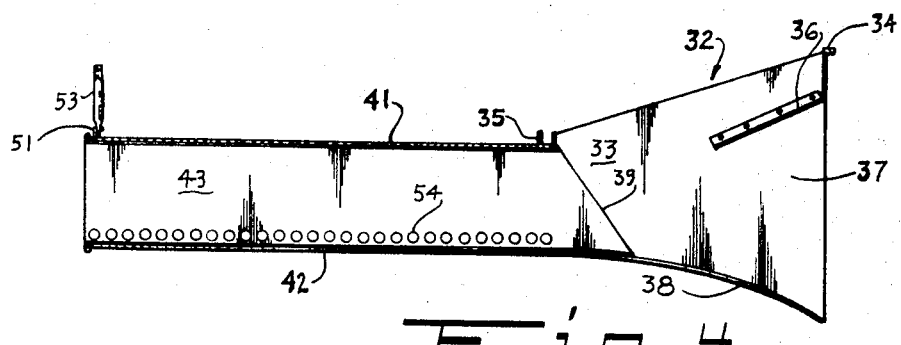
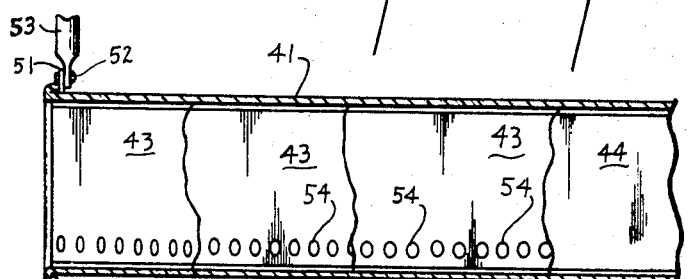
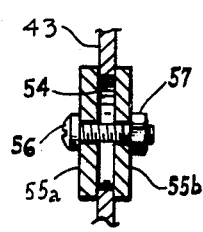
WILLIAM D. CORNETT, JR.
INVENTOR
BY Wm. E. Ford
ATTORNEY

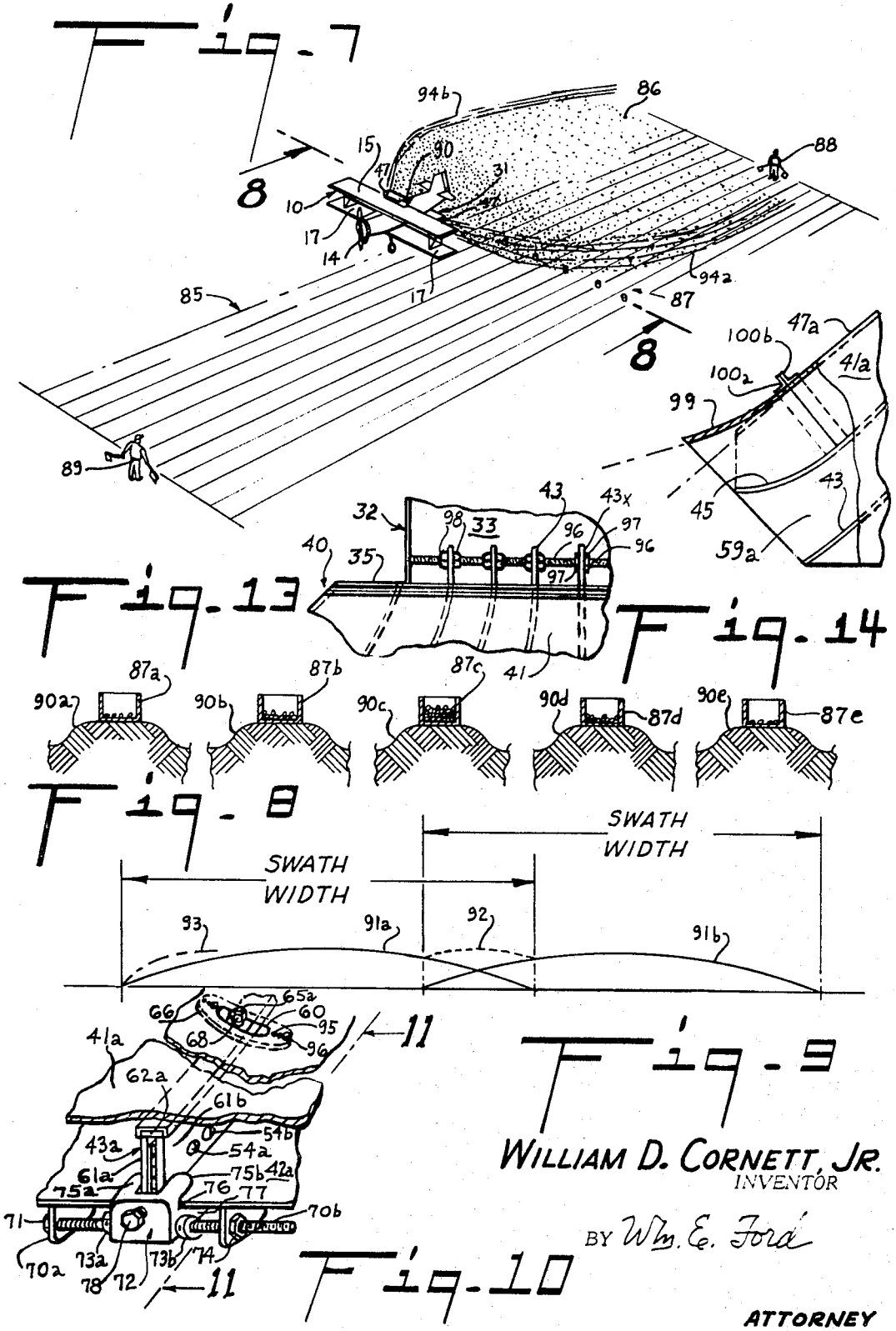

WILLIAM D. CORNETT, JR.
INVENTOR

BY Wm. E. Ford

ATTORNEY

United States Patent Office
3,476,337
Patented Nov. 4, 1969

3,476,337
SOLIDS SPREADER FOR AGRICULTURAL
AIRCRAFT
William D. Cornett, Jr., 2212 Larry Drive,
Port Lavaca, Tex. 77979
Continuation-in-part of application Ser. No. 580,796,
Sept. 20, 1966. This application Nov. 27, 1968, Ser.
No. 779,582
Int. Cl. B64d 1/18
U.S. Cl. 244—136  15 Claims

ABSTRACT OF THE DISCLOSURE

A spreader, fan-shaped in plan, is connected with throat to receive solids from plane hopper to pass rearwardly through channels between vertical vanes, adjustably spaced apart and adjustable in curvature. On each side channels successively outwardly discharge at successively greater angles to plane axis. A louver, on each side of the respective outermost channels, is constructed to receive air therethrough to pass out rearwardly at an angle to the longitudinal axis of the plane that is less than the angle of departure of the air from the outermost channels, and thus the louver air constrains the pattern of solids dispersal by turning the solids discharged from the respective channels to more directly rearwardly extending paths of discharge. The vanes between channels have holes or perforations therein which may be selectively occluded, so that more or less solids pass through respective vanes to the channels successively inwardly, thereby controlling the proportion of total solids discharged from respective channels, thus to control distribution pattern of solids dispersal on the ground.

This application comprises a continuation-in-part of application Ser. No. 580,796, filed Sept. 20, 1966; the invention relating to an improved spreader attachable to the hopper of an agricultural seeder type airplane, and to a method of adjusting the swath pattern of solids delivery from the spreader, whereby a fan-shaped spreader with rearwardly, arcuately extending, symmetrically disposed vanes with openings therein have vane openings selectively controlled whereby to control the swath pattern density curve in manner that an even or substantially even delivery of solids is achieved by controlled swath overlap.

Heretofore, solids spreaders for spreading solids, such as seeds, fertilizers, and insecticides from the spreaders of agricultural seeder type airplanes have endeavored to make adjustment of solids delivery in the hopper gate or in the throat into the spreader but heretofore none have endeavored to make adjustment rearwardly of the throat. As a consequence the control of the swath pattern of solids delivery has been difficult and wide ranges of solids distribution have resulted because of the many variable conditions which can interpose themselves, predetermined structural consideration remaining constant at throat and/or hopper.

Conditions which have heretofore affected, and which will continue to affect, solids swath pattern are the effect of propeller wash which results from direction and speed of propeller rotation as influenced by the relationship (diameter) of propeller to the mass of the airplane and the disposition of its mass. The general result of the propeller wash causes an area of comparatively scarce or diminished solids distribution along a channel to the right side of the axis of flight of the plane.

In this regard, the term "wing wash" is generally employed and also the term "down draft" is used, such being lay words used to describe the manner in which a plane in flight tears up or deflects the mass of air through which the plane is passing. Also, the speed of the plane in flight affects swath pattern and widely varied patterns are obtainable when the same plane delivers' solids at varying speeds. Also, the force of the wind, especially cross-winds, can cause great variation in the delivery of swath pattern as regards the distance from pattern to the flight axis of delivery.

Also, the type of solids delivered, especially as regards relative specific gravities, can effect the swath pattern. Additionally weather conditions, as relative humidity from day to day, can have effect.

By making adjustment in vane openings in each vane, as to the total area thereof, and as to the disposition of selected openings with relation to each other, it is possible to dampen out or diminish most of the undesirable features of the above described effects whereby a much closer control of swath pattern can be obtained, regardless of most of these condition.

It is consequently a primary object of this invention to provide a spreader for an agricultural airplane, and a method of controlling swath pattern delivery therefrom, whereby control is affected by selectively controlling the openings in vanes which extend arcuately rearwardly in symmetrical disposition in the spreader, thereby to control the swath pattern.

It is also another object of the invention to provide a spreader of this class and method of solids distribution therefrom, whereby the solids pass in windstreams rearwardly to cover a fan-shaped area bordered and constrained by the windstream from louvers or air tunnels on either side of the fan-shaped vane housing.

It is also an important object of the invention to provide a spreader of this class in which the vanes may be readily adjustably positioned as to curvature and relative spacing, and in which the selection of vane opening (or occlusion) may be made with ease and rapidity.

It is a further object of the invention to provide means and method of adjusting louver air and direction of louver air discharge from the cockpit of the plane.

It is still a further object of the invention to provide means and method of controlling degree of throat opening and throat curvature from the cockpit of the plane.

It is yet a further and additional object of the invention to provide means and method of adjusting louver air and direction of louver air discharge, also degree of throat opening and throat curvature, all from the cockpit of the plane.

Other and further objects will be apparent when the specification herein is considered with the drawings, in which:

FIG. 1 is a fragmentary elevational side view of the forward part of an airplane with a spreader comprising an embodiment of this invention connected thereto to receive solids from the airplane hopper;

FIG. 2 is an isometric view of the top and rear of the spreader shown in FIG. 1;

FIG. 3 is a spreader plan view taken along line 3—3 of FIG. 1;

FIG. 4 is a longitudinal sectional elevation taken along line 4—4 of FIG. 3;

FIG. 5 is an enlarged, fragmentary, longitudinal elevation, part in section, taken along line 5—5 of FIG. 3;

FIG. 6 is an enlarged transverse sectional view through one of the vane openings shown in FIGS. 2, 4 and 5, the view showing a means for occluding any selected opening;

FIG. 7 is an isometric view showing an airplane equipped with a spreader as shown in FIGS. 1–5, inclusive, the airplane being employed in spreading solids over an agricultural field in accordance with a determined distribution pattern;

FIG. 8 is a transverse sectional elevational view taken along line 8—8 of FIG. 7, showing the seed distribution in measurement cups;

FIG. 9 is a curve of a seed distribution plotted in relation to flight swath, the view illustrating swath overlap;

FIG. 10 is an isometric view illustrating a portion of another embodiment of spreader adapted for selective occlusion of vane openings, and also adapted for selective spacing of vane and adjustment of vane curvature;

FIG. 11 is a longitudinal elevational view, part in section, taken along lines 11—11 of FIG. 10;

FIG. 12 is a transverse elevational view, part in section, taken along line 12—12 of FIG. 11;

FIG. 13 is a fragmentary plan view illustrative of an adaptation of the invention by which the inlet distance between vanes may be selectively adjusted;

FIG. 14 is a fragmentary plan view illustrative of an adaptation of the invention by which the angle of discharge of the wind tunnel may be selectively varied from serviced field to serviced field;

Figure 15:
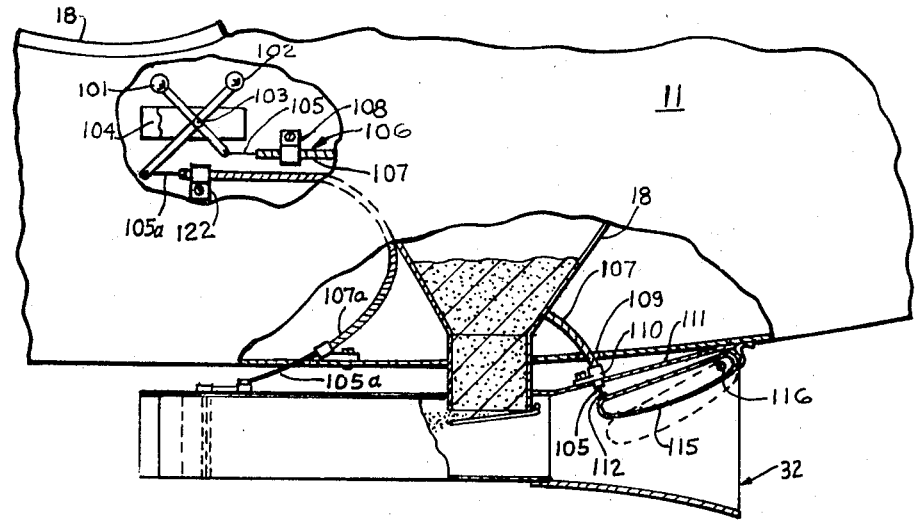
FIG. 15 is a fragmentary side elevational view of a plane, part in section, showing means, an illustrative of method of adjusting both louver discharge angle and degree of throat opening and curvature from the cockpit of the plane.

Referring now in detail to the drawings in which like reference numerals are applied to like elements in the various views, an airplane 10 is shown in FIG. 1 conventionally equipped with a motor 12 at the forward end of the hull or chassis 11, and with the forward end of the motor shaft 13 having a conventional propeller 14 mounted thereon.

Also, the airplane 10 is equipped with wheels 16 and a hopper 18 located forward of the cockpit 21 for carrying solids 28. The airplane shown is of the bi-plane type having upper wing or supporting surface 15 and lower wing or supporting surfaces, not shown in FIG. 1, but shown as lower wings 17 in FIG. 7.

The hopper 18, as shown in FIG. 1, has an inlet 19 controlled by a door 29 and a discharge outlet 22 controlled by a gate 23. The gate 23 is rigidly connected to a pivot axle 20 which also has a lever 24 rigidly connected thereto to comprise the forward element of a linkage chain or assembly 25 which includes as the rearmost member an operating lever or handle 26. The lever or handle 26 is shown to be selectively movable with relation to a quadrant 27 from which extends a pivot 30 on which the lever 26 is pivotally mounted, whereby through the chain or linkages 25 the manipulation of the lever or handle 26 controls the degree of gate opening.

A spreader 31 which comprises the structural part of this invention is shown in FIG. 1 as mounted on the underside of the airplane 10 below the plane chassis 11 and includes a throat 32 connectable below the hopper discharge 22 with the fan-shaped spreader housing 40 extending rearwardly from the throat 32 to terminate below the cockpit 21. The throat 32 provides rearwardly a throat opening 33 which is of length, width, and shape to be controlled by the hopper gate 23.

As shown in FIG. 4, the throat 32 includes forwardly a connection flange 34 by which connection is made forwardly to the chassis 11; and rearwardly the throat 32 also provides a channel 35 by which connection is made to the plane chassis. Also, the throat 32 includes a baffle plate 36 at the forward end thereof which defines the upper limits of the throat inlet 37 through which air encountered in the forward passage of the plane enters the throat 32. The under surface or plate 38, which defines the bottom of the throat, extends arcuately forwardly and downwardly, as best shown in FIG. 4, whereby the entering air is channelized in cooperation with the baffle plate 36 to pass rearwardly into a venturi area of lesser cross-sectional area below the hopper housing gate 23.

The aforesaid fan-shaped spreader 40 has its forward end connected to the rear part of the throat 32 and extends rearwardly and outwardly from the throat outlet 39 in the shape of a fan, as designated. The spreader housing 40 includes an upper plate 41, a lower plate 42, both fan-shaped, with a plurality of vanes 43 being symmetrically disposed to extend from the throat outlet 39 arcuately rearwardly and outwardly, the vanes 43 being symmetrically spaced successively outwardly on each side from a central vane, or partition structure 44.

The spreader 31 is connected beneath the chassis 11 of the airplane 10, and below the hopper 18, by connecting a forward flange 34, which extends across the forward, upper part of the throat 32, to the chassis 11, forwardly of the hopper gate 23; and also by connecting a rear flange 35, which extends across the rear upper part of the throat 32, to the chassis 11 at the rear of the hopper gate 23. A sealing material, such as felt, not shown, may be interposed between the respective flanges 34, 35 and the chassis.

Also, a clip angle 49 is provided on each side of the throat 32 with the horizontal leg of the clip angle notched to receive a bolt 50 pivoted from the chassis of the plane downwardly to extend through the notch so that nuts on the bolt may be threaded thereon to bear upwardly against the under surface of the clip angle leg whereby the throat is releasably latchably connected to the chassis. Also, the upper plate 41 of the spreader housing 40 has truss flanges 51 mounted on the rear edge thereof such flanges 51 being equally spaced apart on opposite sides of the longitudinal axis of the spreader. A pivot bolt 52 extends through each flange 51 and through the lower end of a connection bar 53 whereby the connection bars on each side may be pivoted upwardly and their upper end latched or locked under the chassis as indicated in FIG. 1 and FIG. 4.

The vanes 43 have perforations or round openings 54 therein, also the central vane 44 may be perforated as a matter of choice, as indicated in FIG. 5. The perforations or holes 54 are shown substantially equally spaced apart with each vane having a single row of openings extending from rear forwardly toward throat outlet 39.

A means for occluding any selective opening 54 is shown in FIG. 6 in the form of two closure plates or discs 55a and 55b, these discs being of larger diameter than the holes or openings 54. A machine screw or bolt 56 is shown in FIG. 6 as extended through the disc 55a, through the opening 54 and through the other disc 55b, with a nut 57 being threaded onto the end of the bolt or machine screw 56 to bind the disc tightly over the respective opening or perforation 54.

In cases where the usage of the preader 31 may dictate the provision of fixed vanes 43 rather than adjustable vanes, rivets 58 may be provided to extend upwardly through the lower plate 42 and downwardly through the upper plate 41 at spaced apart points to pass into the respective lower and upper edge faces of the vanes to hold them in position.

In the theory of operation of the invention the seeds, fertilizer, or insecticides comprising the solids 28 fall from the hopper 18 into the throat 32 and headwind entering into the throat 32 through the inlet 37 passes rearwardly and picks up the solids and carries them into four separate windstreams on each side of the longitudinal axis of the spreader fan or vane housing 40. The outer windstreams between the side plates 45 and 46 and the respective vanes 43 adjacently inwardly thereof determine the passageways of greatest curvature. The outermost windstream outlets 59a and 59b thus extend with discharge axes at the greatest angle to the longitudinal axis of the spreader 31 and this angle is made greater by the fact that the upper and lower plates 41, 42 are chamfered or beveled as best shown in FIG. 2.

Obviously there is a component of the entering headwind which tends to blow part of the solids through the openings or perforation holes 54 in the outermost vanes 43 as indicated by the illustrative dotted lines in FIG. 2. In like manner there is a component of windstream in each of the passages successively inwardly which blows part of the solids through the holes 54 in the respective vane adjacently inwardly thereof, to pass rearwardly along with the solids borne along by such respective next inwardly passage.

Obviously a greater amount of solids tends to be deflected rearwardly from a vane of greater radius of curvature than from a vane of lesser radius of curvature. Also it is obvious that the particular angle at which one vane opening extends in relation to the angle at which another vane opening extends will have direct bearing on the amount of solids passing through the respective openings. Also relative amounts of solids deflected through respective vanes is proportional to the total area of vane openings selected to be left open.

In the spreader shown in FIGS. 2-6, inclusive, the vanes 43 are indicated as being rigidly fixed in position in the spreader housing 40 by rivets 58 and are thus not adjustable as to curvature after the spreader housing 40 is once assembled. Thus, in this type of spreader housing, adjustment as to relative deflection of solids from vane to vane other than as affected by the relative fixed curvature of the respective vanes, can be varied only by variation of the number of openings 54 selected to be left open in the various vanes, and by the angular disposition of those vane openings that are selected to be left open.

Even with the vanes rigidly fixed and not adjustable after assembly, a problem of increased complexity may be visualized in view of the vast multiplicity of adjustment combinations which may be made as to vane openings to be left open. It can thus be seen that a vastly greater number of variations, or increments of adjustment, can enter if the curvature of the vanes could be made selectively adjustable as to the successive vanes on each side of the longitudinal axes of spreaders.

Also it can be seen that the selective closure of the openings 54 may be achieved with some difficulty in the form of the invention shown in FIGS. 2-5, inclusive, especially as regards those openings substantially forwardly from the rear edge of the spreader and substantially inwardly from the throat 39.

Thus it may be desirable to achieve selectivity of vane opening occlusion by various mechanical means which can be put into effect more readily than the means shown in FIG. 6.

With the foregoing problem in mind, the disclosures shown in FIGS. 9-12 are included as part of the invention whereby vane curvature, and complementally, vane openings are more readily selectively adjustable.

Referring now in detail to the aforesaid FIGS. 10-12, inclusive, upper and lower spreader plates 41a, 41b are shown in FIG. 10, with the upper plate 41a having a cam slot 60 therein spaced forwardly of the rear edge of the plate 41a. Also, such a plate 41a will also have therein a second cam slot, not shown, intermediate the rear cam slot 60 and only the forward end portion of a respective vane, as the vane 43a shown in FIG. 10, might be rigidly fixed to the plates 41a, 41b.

The vane 43a is of construction best shown in FIG. 12 and includes side plates 61a, 61b, with upper and lower cross-plates 62a and 62b tying the side plates 61a and 61b together and with an upper gasket 64a and a lower gasket 64b being provided on top of, and under, the respective cross-plates 62a and 62b. A stud 65 upstands from the top plate 62a to extend through the cam slot 60 and through a closure plate 66, such closure plate 66 being indicated in dotted lines in FIG. 10 as extending over and around the cam slot 60. Above the closure plate 66 the stud 65 extends through a washer 67 and has the nut 68 threaded thereonto thereby to rigidly position the vane 43a with relation to the respective upper plate 41a and lower plate 41b. Obviously this can be accomplished since the lower cross-plate 62b has a similar stud 65 to extend downwardly therefrom through a cam slot 60b in the lower plate 41b, the cam slot 60b extending parallel with, and in vertical alignment with the cam slot 60 therebelow.

The length of the spreader or vane housing 40a, indicated in FIG. 10, is such that two pair of respective upper and lower studs 65a, 65b in two longitudinally spaced apart cam slots 60 should provide ample adjustment contact to permit a respective vane 43a to adjust itself to any curvature to which the vane may be conformed, and for this reason the isometric view of FIG. 10 is shown in broken section thereby indicating that two or more cam slots 60 may be provided as spaced apart along the length of the plates 41a, 42a.

Then, in order to space the vanes 43a laterally, or transversely apart, there is provided for each vane adjustment lugs 70a and 70b, respectively disposed transversely outwardly and inwardly of the maximum adjustment travel which may be provided for the respective vane. A threaded bolt 71 is passed threadably through the outer lug 70a, and with clearance through an adjustment clamp 72, the bolt 71 being fixed with relation to the clamp 72 by means of spacer rings 73a and 73b, respectively, on either side of the clamp and pinned thereto. The shank end of the bolt 71 then extends with slight clearance through the inner lug 70b, and an adjustment or lock nut 74 may then be threaded thereon to lock the bolt 71 against the lug 70b thereby to latch the clamp 72 in any predetermined position.

The respective vane 43a, for which each clamp 72 is provided, includes fingers 75a and 75b which extend inwardly from the clamp on either side of the respective vane 45a, as the clamp bears at 76 on the rear edge of the lower plate 42. The lower part 77 of the clamp 72 extends forwardly under the lower plate 42a with the upper surface thereof disposed a distance below the fingers 75a, 75b, a distance substantially the thickness of the plate 42a.

An adjustment screw or bolt 78 is threaded longitudinally through the clamp 72 to bear against the lower cross-plate 62b of the vane 43a, as best seen in FIG. 11. Obviously, it can be seen that the clamp 72 may be adjusted transversely to move the vane 43a to the right or left, as to its rear end portion, while the bolt 78 may be threaded into the clamp 72 to bear against the vane 43a and urge it forwardly. As the vane 43a is urged forwardly, the aforesaid spaced apart upper and lower studs 65a, 65b, in the spaced apart cam slots 60, will slide in the cam slots accordingly to conform to the reuslting increased curvature caused in the vane 43a.

Obviously, when the clamp 72, as shown in FIG. 10, is moved relatively to the right, the vane 43a tends to straighten out, whereas if the clamp is moved relatively to the left this adjustment will force the vane 43a into greater curvature.

Also, as aforesaid, when the adjustment screw 78 is threaded forwardly, the vane 43a is withdrawn rearwardly, the vane tends to straighten out to lesser curvature. By thus being able to adjust both the spacing apart and curvature of the vanes 43a, a wide, selectively variable range in effective total solids transfer areas, through respective vanes 43a, as the total lateral components of non-occluded perforations or holes 54a, 54b, 54c; 54d, 54e, 54f; 54g, 54h; 54j; as disclosed in longitudinally spaced apart series, series of threes being shown for purposes of illustration in FIG. 11.

Thus rearwardly, opposed holes or perforations 54*a*, 54*b* and 54*c* are provided through the vane 43*a*. Then forwardly of this rearmost series, an intermediate series of openings 54*d*, 54*e* and 54*f* are provided in the vane 43*a*. Also, forward of the intermediate series, a forward series of openings 54*g*, 54*h* and 54*j* are provided. Rearwardly an adjustment plate 79 is shown, between the side plates 61*a*, 61*b*, with slots 78*a*, 78*b* and 78*c* therein spaced apart as shown in FIG. 11, whereby to control the opposed vane openings 54*a*, 54*b* and 54*c* in the opposed side plates 61*a* and 61*b*. Vane openings 54*a* and 54*b* are indicated in the inner plate 61*b* in FIG. 10 and vane openings 54*f* are indicated in dotted lines in FIG. 12, together with the slot 78*f* in the selector plate 80.

The selector plate 79 has a nut 82*a* welded on the rear end thereof, also a nut 82*b* is welded on the rear end of the handle 80*a* of the selector plate 80; and also a nut 82*c* is welded on the rear end of the handle 81*a* of the selector plate 81. Thus a tool, not shown, comprising a handle from which a rod extends forwardly with a threaded end, may be engaged successively in the nuts 82*a*, 82*b* and 82*c* and the selector plates 79, 80 and 81 pulled rearwardly to occlude the respective vane openings 54*c*, 54*f* and 54*j*, thereby reducing vane opening. Again, this process may be repeated a step at a time, first to additionally occlude the vane openings 54*b*, 54*e* and 54*h*, and finally the vane openings 54*a*, 54*d* and 54*g* in case all of the vane openings are not to be used. Also, selectively, respective selector plates may be positioned to occlude selective numbers of a respective series of openings or perforations. Obviously, a wide range of total vane opening areas may be left occluded, or non-occluded, through each vane, and thus a wide range of total lateral components of non-occluded areas or solids transfer areas may be arrived at, as desired.

A cover plate 66, as aforesaid, is provided for each cam slot 60. Such a cover plate is shown in dotted lines in FIG. 10 as being longer than the cam slot 60 and as having the stud 65*a* passing upwardly, centrally therethrough, the washer 67, shown in FIGS. 11 and 12, on which bears the nut 68, not being shown in FIG. 10 for purposes of clarity. The cover plate 66 has a row of holes 95 therein, at either end, to receive at either end a capscrew 95 therethrough, the capscrews being threadable selectively into threaded bores, not shown, in the plate 41*a* to hold the cover plate 66 in position in various selective positions of adjustment of the vanes 43*a*. The under cover plate 66 for the cam slot 60 in the plate 42*a* is correspondingly selectively fixed in position corresponding with the various vane adjustments.

As a feature of construction, it may be noticed that the forward end portion of the vane 43*a*, as shown in FIG. 11, may be welded, as at 98*a* and 98*b* to the respective upper and lower plates 62*a* and 62*b*. Also the plates 62*a*, 61*a*, 61*b* and 62*b*, comprising the vanes 43*a*, should be of light material to permit the flexing of the vanes 43*a* in adjustment. Thin gauge sheet metal, steel, light stainless steel, aluminum, or certain plastics may be used to permit this flexibility while being of strength to space the plates 41*a*, 42*a*, and to withstand the frictional wear of the solids laden windstreams passing thereby.

Referring now to FIGS. 7–9, inclusive, an airplane 10, as a bi-plane, with upper wing 15, and lower wings 17, is shown having a spreader 31 attached underneath to operate as the spreader 31 shown in FIG. 1, thereby to distribute solids, as seeds 86, over a field 85 which has been plowed, harrowed, or otherwise prepared or conditioned to receive the solids.

The swath or width of path over which the seeds will fall can be substantially well known by experience. In order to measure the solids density of seed distribution across a swath, a row 87 of measuring cups is arranged to extend transverse across a swath distance of the field. Before the plane 10 arrives over a field, as shown in FIG. 7, for the pilot 90 to operate the solids hopper gate and release the seeds, two flagmen 88 and 89 have taken positions at opposite ends of the field 85, lining up on the central cup of the transverse row of cups 87, thus to designate the axis of approach of the plane 10, which axis is parallel to the rows of field if a ploughed field is to be seeded.

When the plane approaches, it first flies over the flagman 88 in direction of the flagman 89, and when in proper position over the field, the flagman 89 may give signal for the pilot 90 to operate the hopper gate. The solids, as seeds, then fall into the throat of the spreader 31 and the headwind entering the throat inlet picks up the solids and delivers them into the throat windstream inlet so that the solids are carried rearwardly by the headwinds in windstreams determined by the spacing and curvature of the vanes, as the vanes 43 shown in FIG. 2.

The component of the windstreams which tend to blow directly rearwardly will blow part of the solids from each windstream through the vane openings 54 into the next adjacent windstream inwardly thereof, and this happens successively within the vane housing 40, from outboard windstreams successively inwardly, and thus there can be such a balance of effective vane opening areas that conceivable substantially even distribution may tend to be achieved from over the path of seed distribution. In practice this may never be fully accomplished but by studied adjustments an approximation to even distribution can be approached.

To foretell adjustments, measuring cups 87*a*, 87*b*, 87*c*, 87*d* and 87*e*, as shown in FIG. 8, may receive the seeds which fall therein from a plane passed thereover, and the seed in each respective cup may be counted. As indicated in FIG. 8, the cups 87*a* and 87*e* are disposed on those outermost rows 90*a*, 90*e*, which may be calculated to fall under the outermost limits of the swath pattern of distribution, while the cup 87*c* is disposed on a row 90*c* which is directly under the axis of flight over which the plane passes, while the cups 87*b* and 87*d* are disposed on intermediate rows 90*b*, 90*d*. Thus swath width curves may be plotted as shown in FIG. 9 in which the ordinate is plotted in seed depth or density and the abscissa is plotted in transverse distance or cup spacing. In the swath widths plotted, curves 91*a* and 91*b* are shown as having been obtained after flights over two swaths with there being an overlap as to the swath widths. This overlap has been guided by the flagman who, after a first flight, has moved transversely less than full swath width to direct the second flight. In this case, seeds are deposited over the area of overlap on each flight, so that the seeds *resultantly* deposited are plotted as ordinates for the seeds cumulatively deposited at successive abscissae points with the result that a solids density curve 92 is obtained as indicated in dotted lines in FIG. 9.

The primary object of experimentation thus becomes that of controlling the amounts of solids which will pass into, and be deflected in part, from respective windstreams in manner that substantial evenness of distribution may be obtained for the solids. In detail, experimentation may thus seek to arrive at a distribution which will increase the amount of solids, as seeds, deposited in the cups 87*b* and 87*d* in FIG. 8 with relation to the amount of seeds deposited in the central cup 87*c*. Experimentation thus seeks to arrive at a curve which departs from being an arc of a circle and approaches a flattened parabola or ellipse, as indicated by the fragmentary phantom line curve 93 to the left in FIG. 9. Thus, when such flattened curves are obtained by adjustment of seeds distribution in the respective windstreams between the vanes, the swath overlap may be calculated. Such an overlap is sought which will approach a short flattened curve 92 of average ordinate substantially equal to the average ordinate of the curves 91a and 91b. As the overlap is thus diminished, it follows that full and even seed distribution may be obtained over a field 85, with a lesser number of flights being required to evenly seed the field.

Also, the attained evenness of distribution compares favorably with the conventional distribution which results in the stacking up of the seeds along a path substantially parallel to, and generally directly below the path of flight of the longitudinal axis of the plane. It may be known that a spreader, (with vanes spaced apart respective predetermined distances and extending at respective predetermined curvatures, and with effective total solids transfer areas or total lateral components of non-occluded perforation areas through respective vanes being predetermined) may be installed upon an airplane which is to be flown in manner to deliver seeds over a predetermined swath width of ground area.

Also the swath width overlap may be predetermined under such conditions that will result in a most even density of solids distribution over the area to be seeded, thus to obtain a desired agricultural result. Under such conditions the amount of seeds necessary to obtain the desired result can be estimated with substantial accuracy. Obviously, this predetermined amount of seeds should be substantially less than the seeds that may have to be delivered from a spreader of conventional airplane installation to obtain a corresponding agricultural result.

A special feature of construction resides in the provision of the air louvers 47, one on each side of the spreader or vane housing. Thus, as indicated in FIG. 7, the headwind which blows directly into these air louvers 47 is naturally directed with greater force than the headwind which blows into the spreader throat inlet to be reduced in force by throat friction. In case of the air which blows into the air louvers, it passes rearwardly therethrough with greater force. Thus, the full force of the air louver windstreams forms an air barrier or wind barrier which restrains and channelizes inwardly the less forcefully directed, solids carrying windstreams which would otherwise intersect and cross these wind barriers from the air louvers. The air louver windstreams 94a and 94b thus help to define the swath width of solids distribution, and with an accuracy and force affected in degree by the force or speed of flight of the plane.

The ultimate result of all adjustments is to substantially dampen, or to completely dampen out, all of the adverse factors heretofore encountered to affect even distribution, as those factors hereinabove enumerated.

As shown in FIG. 13, the aforesaid solids distribution control may include means to adjust the spacing of the vanes 43 on either side of the central vanes 43x, such means serving thus to selectively space apart the vanes at the inlet into the solids spreader 40. This may be accomplished by providing threaded adjustment rods 96, which extend transversely outwardly from an anchor flange 97 welded on opposed sides of the central vane 43x. From a central vane anchor flange 97 each rod 96 extends outwardly through openings in the respective vanes 43 to base outwardly in the side plate of the throat 32. Adjustment nuts 98 are provided on the rod 96 on opposite sides of each vane whereby the spacing apart of the vanes at the inlet may be selectively varied. In this regard, it should be noted that in this case the forward ends of the vanes would not be attached upwardly to the upper plate 41 or downwardly to the lower plate 42 of the spreader housing 40. Rather, the forward parts of the vanes would float with relation to the forward part of the spreader housing 40, and in this case they could be anchored to the upper and lower plates 42, 42, at some point rearwardly. In this regard, some finer adjustment of the solids flow through the vanes could be obtained by also including the rear spacing adjustment shown in FIG. 10, but in many cases the forward adjustment might give all control variations that could be needed.

As to spacing the vanes 43 from their forward ends, obviously this is effected by threading the lead nut 98 in direction of adjustment and following by threading the following nut 98 to urge the vane under adjustment back into contact with the lead nut.

As may be visualized, a vast multiplicity of factors enter into the theory of solids distribution control as effected by mechanical adjustments within a spreader or vane housing. Due to this vast multiplicity of factors which enter into the problems solved by this invention, spreaders of various configurations, dimensions and designs may serve for particular services, in particular areas, and under particular climatic conditions. By way of lilustration, see FIG. 14.

In FIG. 14 there is shown a method of construction which permits variation in adjustment of the direction of discharge from the air louver 47a. This construction consists of providing the air louvers 47a with selectively replaceable rear end portions 99. This is accomplished by changing the rear end portions 99, each having an angle flange 100a to connect an oppositely facing corresponding angle flange 100b so that the angles may be bolted together by bolts, not shown. In this regard, the outward slope of the selectively employed air louver rear portions 99 can causes substantial variation in swath pattern, as indicated by the tangentially extending dotted line shown in FIG. 14.

Also, the methods and systems of controlling the solids distribution pattern or swath widths may vary to best apply to conditions encountered and to problem posed for solution. For illustration, a vane housing 40a with means for mechanically adjusting vane spacing and curvature, and also equipped for the selective control of the openings in each vane may be desirable where a wide range of factors enter into adjustments. Otherwise, where the prolems encountered do not range over so broad an expense, a spreader or vane housing 40 may serve adequately where selective adjustment is provided only as to the individual occlusion or leaving open of the vane openings.

FIG. 15 shows a fragmentary portion of a chassis 11 with its cockpit 18 being shown clut away to show control levers 101 and 102 mounted on a pivot 103 which extends inwardly from the lever bracket 104. The lower end of the lever 101 has the rear end of the rod 105 of the flexible shaft 106 pivotally connected thereto. The sheath or housing 107 of the flexible shaft 106 is anchored just forwardly of the lever 101 by means of an anchor clamp 108, then forwardly of the hopper 18, there may be seen in FIG. 15, and to larger scale in FIG. 16, the forward portion of the sheath or housing 107 which extends through an opening 109 in the belly of the plane to terminate in an anchor bracket 110 which is disposed centrally upon the top plate 111 of the throat 32. Below the anchor bracket 110 the sheath or flexible housing 106 terminates and the rod 105 of the flexible shaft 106 extends on therethrough for pivotal connection by a suitable fitting 112 to the rear upper portion of a hollow pontoon baffle, or more properly a damper unit 115. The forward end of the damper unit 115 is pivotally mounted on pivot rod 116 which extends transversely across the damper 115 and through the throat side plates to have its end journalled in the retaining caps 117a, 117b, FIG. 18, which are affixed to the side plates 32a, 32b of the throat 32. As the head of the lever 101 in FIG. 15 is urged forwardly, the damper unit 115 is lifted upwardly, or as the head of this lever 101 is withdrawn rearwardly, the rod 105 tends to extend below the forward end of the sheath 107 and urge the throat unit or damper 115 downwardly, thereby restricting the throat opening. Also, as the lower surface of the damper unit 112 is arcuately, downwardly convexly shaped, the streamlined course of the entry air is changed from a less exaggerated to a more exaggerated contour, and greater venturi effects the head of the lever 101 may be pulled rearwardly.

Figure 16:
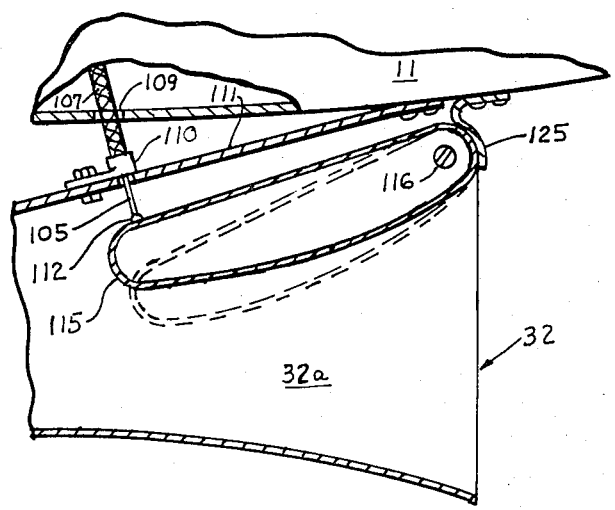
FIG. 16 is a fragmentary sectional elevational view illustrative of means and method of adjusting degree of throat opening and curvature from the cockpit of the plane.
Figure 17:
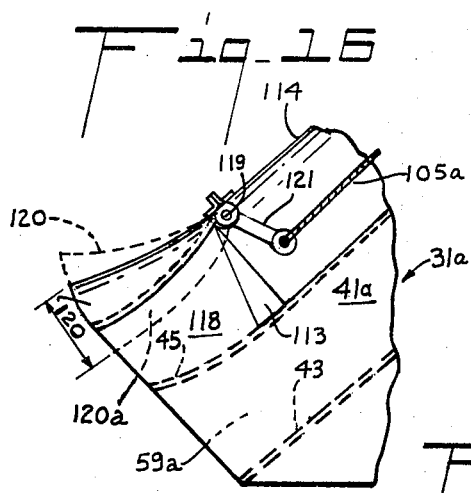
FIG. 17 is fragmentary plan view of a rear corner of a spreader, including louver, illustrative of a means and method of adjusting angle of louver air discharge.

FIG. 16 is a plan view which shows an air louver 114 of arcuate cross-section, to the rear of which a portion 113 merges to join an upper plate extension 118 of the upper plate 41a. The under side of the louver 114 and the lower plate, not shown, of the spreader 31a being correspondingly constructed. An adjustable rear extension 120 of the louver 114 is also generally of arcuate cross-section to extend as indicated in FIG. 17. The forward end of the louver extension 120 is pivotally mounted upon a vertical pivot bolt 119, and the louver extension can pivot from position shown in FIG. 17, outwardly until the overextended portion 120a, offset to fit under the plate portion 118, almost clears from under the upper plate extension 118 (and likewise from over a correspondingly constructed louver plate portion). At such time the outermost portion or apex of the louver extension 120 will occupy the left and forwardmost dotted line position shown in FIG. 12.

The louver extension 120 is rigidly connected to the pivot bolt 119 to pivot therewith, and also a lever 121 has one end fitted over the pivot bolt 119 and rigid therewith, the other end of the lever 121 having the rod 105a of a flexible shaft 106a pivotally connected thereto. The rod 105a extends upwardly and forwardly, as shown in FIG. 15, to pass through an anchor bracket 122 and into the sheath or flexible shaft housing 107a which is rigidly connected to terminate at the anchor bracket 122.

From the anchor bracket 122 the flexible shaft sheath 107a, with the rod 105a therewithin, extend upwardly and rearwardly within the chassis 11 to an anchor clamp 108a within the cockpit 18, and to which the rear, upper end of the sheath 107a is anchored. The flexible shaft rod 105a extends further to the rear to be pivotally connected to the lower, rearward end of the control lever 102. Thus when the head of the lever 102 is urged forwardly, the louver extension 120 is swung toward the center of the plane to reduce the angle of discharge of louver air with relation to the flight axis of the plane. Conversely, when the head of the lever 102 is pulled rearwardly, the louver extension is swung outwardly (clockwise), thus to increase the angle of louver air discharge with relation to flight axis.

Obviously, a correspondingly constructed louver extension is provided on the right rear end portion of the spreader 31a, and likewise manipulated by the lever 102; a corresponding flexible shaft arrangement extending from the lower end of the lever 102.

Figure 18:
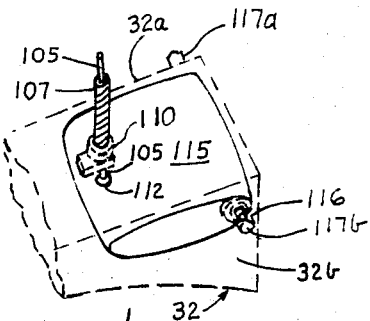
FIG. 18 is an isometric view of a throat damper, illustrative of means and method of adjusting degree of throat opening and curvature.

With the arrangements shown in FIGS. 15, 16 and 18, the throat air may be controlled, for instance on any day of service when the force (and direction), of the wind may change while a plane is flying in service. Also, with the arrangements shown in FIGS. 15 and 17, the angle of louver air discharge can be changed during flight service, better to control operation at substantially the same optimum pattern of delivery, regardless of changes in wind, weather and the like.

The apparatus and methods of operation obviously offer a wide range of selectivity to meet various conditions in service and thus to enable prior selection and also control during flight of factors such as pattern, swath, and evenness of distribution. The drawings are illustrative of the various solutions of problems and the claims are illustrative of the various forms and method steps.

I claim:

1. In combination with an airplane including a solids hopper centrally disposed forward of the cockpit, with said hopper having a filling inlet, a discharge outlet therebelow and a gate pivotally mounted across said outlet to control the outlet, and lever means operable from the cockpit to control the gate, the improvement consisting of, a spreader including a throat connectable to the airplane to receive solids discharged through said hopper outlet and providing a rear discharge opening for solids, a vane housing connected to said throat to receive solids through said throat rear discharge, said vane housing including, a rearwardly and outwardly diverging top plate, a rearwardly and outwardly diverging bottom plate spaced below said top plate, a side plate on each side between said top and bottom plates, a substantially centrally disposed, directly rearwardly extending, partition structure between said plates, a plurality of vertically disposed vanes with forward ends symmetrically spaced at predetermined distances apart across said throat rear discharge and extending rearwardly with predetermined vane curvature successively greater outwardly from, and symmetrically disposed with relation to, said partition, said vanes thus dividing the vane housing into windstreams, means to affix said vanes with relation to said top and bottom plates, an air louver on each side outwardly and forwardly of said vane housing and defined in cross-section by a respective side plate and an arcuate louver plate adjoined thereto, with said louver plate extending at an angle to flight direction for louver air discharge, a plurality of spaced apart solids passage holes in each vane disposed from the rear end forwardly, and means for selectively occluding said passage holes whereby to predetermine the total opening area through each vane and the total component transverse area through each vane for controlling solids passage between windstreams, whereby the louver air discharge limits the area over which solids are distributed upon the ground from an airplane in flight thereover, and whereby the solids discharged from respective windstreams determines the density pattern of solids distribution over said area of distribution.

2. A spreader as claimed in claim 1, in which at least the rear part of each vane is free to move laterally of the spreader axis, in which clamp means is provided for vane adjustment including means to effect clamp means movement over a predetermined distance of transverse travel, whereby to adjust vane spacing and curvature.

3. A spreader as claimed in claim 1, in which at least the forward parts of said vanes are free to move laterally from said partition, and in which a threaded rod extends between each throat side to said partition, with opposed nuts being disposed on said rod on each side of the vanes outwardly of said partition, whereby the spacing of said vanes may be adjusted at the throat.

4. A spreader as claimed in claim 1, in which at least the rear ends of said louver plates are detachable, and a plurality of rear end constructions being provided, with various angles of discharge outwardly and rearwardly, whereby rear end constructions may be selectively installed to provide selectivity of air louver windstream direction of discharge.

5. The method of dispersing solids over an agricultural field in parallel and transversely overlapping swaths comprising serially transporting solids along a predetermined axis of transport over the field and releasing the solids to be carried rearwardly in a plurality of channelized windstreams disposed symmetrically on either side of a substantially axially extending stream, with streams successively outwardly of a respective axially extending central stream discharging at successively greater angles thereto and turning in direction rearwardly thus to constrain the streams successively inwardly toward the transport axis by windstreams channelized rearwardly and outwardly at predetermined angles to the path of transport, and controlling the dispersion of solids from the channelized streams by diverting predetermined parts of streams inwardly into adjacent streams, and transporting and correspondingly releasing solids along an axis parallel to, and spaced a predetermined distance not greater than half swath width from said first axis, whereby the solids deposit on the field therebelow with substantial uniformity as accomplished by predetermined swath pattern overlap.

6. The method of dispersing solids over an agricultural field in parallel and transversely overlapping swaths comprising serially transporting solids along a predetermined axis of transport over the field and releasing the solids to be carried rearwardly in a plurality of channelized windstreams disposed symmetrically on either side of an axis of dispersal, with streams successively outwardly of the axis being discharged from channel at successively greater angles to said axis, and turning in direction rearwardly thus to constrain the streams successively inwardly toward the axis by windstreams channelized rearwardly and outwardly at predetermined angles to the path of transport, and controlling the dispersion of solids from the channelized streams on each side by diverting predetermined parts of streams inwardly into adjacent streams, and transporting and correspondingly releasing solids along an axis parallel to, and spaced a predetermined distance not greater than half swath pattern width from the first axis, whereby the solids are deposited on the field therebelow with substantial uniformity as accomplished by predetermined swath pattern overlap.

7. The method of dispersing solids as claimed in claim 6 in which transverse sections of solids density are taken of successive releases and in which windstream width and curvature is successively adjusted as dictated thereby.

8. The method of dispersing solids as claimed in claim 6 in which transverse sections of solids density are taken of successive releases and in which areas of solids deflection from windstream into adjacent windstream are successively adjusted as dictated thereby.

9. The method of dispersing solids as claimed in claim 6 in which transverse sections of solids density are taken of successive releases and in which windstream width and curvature and areas of solid deflection from windstream into adjacent windstream are successively adjusted as dictated thereby.

10. The method of dispersing solids as claimed in claim 6 in which distribution control is further effected by adjusting air delivery path into said channelized windstreams.

11. The method of dispersing solids as claimed in claim 6 in which air is passed through control channels outboard of the outermost windstream channel and at adjustably controlled angle during flight, thus to control boundary of swath pattern.

12. The method of dispersing solids as claimed in claim 6 in which distribution control is further effected by adjusting air delivery path into said channelized windstreams, and in which boundary of swath pattern is adjustable controlled during flight by passing air through control channels outboard of the respective outermost windstream channels at selectively controlled angles of discharge.

13. A spreader as claimed in claim 1 which additionally includes a pontoon damper across said throat, and means to selectively pivot said damper upwardly and downwardly from the upper front end of the throat, thus to control inlet air passage through the throat prior to passage through the vane channels.

14. A spreader as claimed in claim 1 in which the rear ends of said louver plates are pivotally mounted forwardly, and in which means included with the spreader operable from the cockpit of the plane may manipulate the louver plates to selectively control angle of louver air discharge.

15. A spreader as claimed in claim 1 in which an arcuately shaped pontoon damper is provided across the upper part of the throat and pivoted forwardly and controlled by means actuated from the cockpit, the chassis of the plane providing an arcuate cowl extending downwardly therefrom in which the forward end of said pontoon damper sealably pivots.

References Cited

UNITED STATES PATENTS

| | | | |
|---|---|---|---|
| 1,691,205 | 11/1928 | Morse | 244—136 |
| 2,098,887 | 11/1937 | Satterlee | 239—171 |
| 2,772,061 | 11/1956 | Sellers | 244—136 |
| 3,204,895 | 9/1965 | Razak | 244—136 |

FOREIGN PATENTS 765,091  1/1957  Great Britain.

MILTON BUCHLER, Primary Examiner

J. E. PITTENGER, Assistant Examiner

U.S. Cl. X.R.

239—171